(12) United States Patent
Berger et al.

(10) Patent No.: US 8,091,959 B2
(45) Date of Patent: Jan. 10, 2012

(54) DISPLAY SYSTEM FOR A VEHICLE SEAT

(75) Inventors: Georg Berger, Schermbeck (DE);
Thomas Bulirsch, Lichtenfels-Schney (DE); Andersen Yuk-Fai Cheng, London (GB)

(73) Assignee: Inviseo Media Holdings Limited (GB)

( * ) Notice: Subject to any disclaimer, the term of this patent is extended or adjusted under 35 U.S.C. 154(b) by 294 days.

(21) Appl. No.: 12/297,394

(22) PCT Filed: Apr. 20, 2007

(86) PCT No.: PCT/IB2007/002341
§ 371 (c)(1),
(2), (4) Date: Apr. 3, 2009

(87) PCT Pub. No.: WO2007/122514
PCT Pub. Date: Nov. 1, 2007

(65) Prior Publication Data
US 2009/0322125 A1 Dec. 31, 2009

(30) Foreign Application Priority Data

Apr. 21, 2006 (EP) .................... PCTEP2006003693
Mar. 20, 2007 (GB) .................... 0705316.8

(51) Int. Cl.
*A47B 83/02* (2006.01)
*A47B 37/00* (2006.01)
*A47B 13/16* (2006.01)
*A47B 3/14* (2006.01)
*A47B 5/04* (2006.01)
*A47C 7/62* (2006.01)
*G09F 7/12* (2006.01)
*G09F 3/18* (2006.01)

(52) U.S. Cl. .................. 297/163; 297/188.04; 108/25; 108/42; 108/44; 108/90; 108/134; 108/152; 40/320; 40/593; 40/594; 40/661

(58) Field of Classification Search .............. 297/163, 297/188.01, 188.04, 188.06, 188.07, 146; 40/320, 593, 594, 661; 108/25, 42, 44, 90, 108/134, 152
See application file for complete search history.

(56) References Cited

U.S. PATENT DOCUMENTS 2,131,586 A * 9/1938 Dano ........................ 40/320
2,517,433 A 8/1950 Hoven et al.
(Continued)

FOREIGN PATENT DOCUMENTS

DE 43 05 695 A1 9/1994
(Continued)

OTHER PUBLICATIONS

International Search Report for parent application PCT/IB2007/002341 having a mailing date of Mar. 13, 2008.

*Primary Examiner* — Rodney B White
(74) *Attorney, Agent, or Firm* — Andrus, Sceales, Starke & Sawall, LLP

(57) ABSTRACT

A display system for a vehicle seat comprises a receiving surface including a recess. A cover plate is adapted to cover and/or fit into the recess. The recess has a support surface and a slot for receiving a tab located on the cover plate. An information carrier can be located between the cover plate and the support surface.

19 Claims, 14 Drawing Sheets

U.S. PATENT DOCUMENTS

| | | | |
|---|---|---|---|
| 2,619,395 A * | 11/1952 | Kent | 297/188.07 X |
| 3,795,422 A * | 3/1974 | Robinson et al. | 297/146 |
| 4,511,178 A * | 4/1985 | Brennan | 297/163 X |
| 5,241,767 A | 9/1993 | Fuda et al. | |
| 5,720,515 A | 2/1998 | Haffner | |
| 6,592,179 B1 * | 7/2003 | Miyazaki | 297/146 X |
| 6,758,518 B2 * | 7/2004 | Ingram et al. | 297/163 X |
| 7,104,599 B2 * | 9/2006 | Berger et al. | 297/163 |
| 7,611,198 B2 * | 11/2009 | Schweizer | 297/188.07 X |
| 7,621,593 B2 * | 11/2009 | Dickinson | 297/163 |
| 2002/0029504 A1 | 3/2002 | Lowndes | |
| 2003/0217673 A1 * | 11/2003 | Berger et al. | 108/44 |
| 2004/0124675 A1 * | 7/2004 | Ingram et al. | 297/188.04 X |
| 2005/0115126 A1 | 6/2005 | Rampen et al. | |
| 2005/0204596 A1 * | 9/2005 | Peng | 297/188.04 X |
| 2005/0206206 A1 * | 9/2005 | Peng | 297/217.3 |

FOREIGN PATENT DOCUMENTS

| | | |
|---|---|---|
| EP | 1 260 433 A2 | 11/2002 |
| JP | 2002-106181 A | 4/2002 |
| WO | 99/04381 A1 | 1/1999 |
| WO | 99/32016 A1 | 7/1999 |
| ZA | 200 200 707 A | 7/2002 |

* cited by examiner

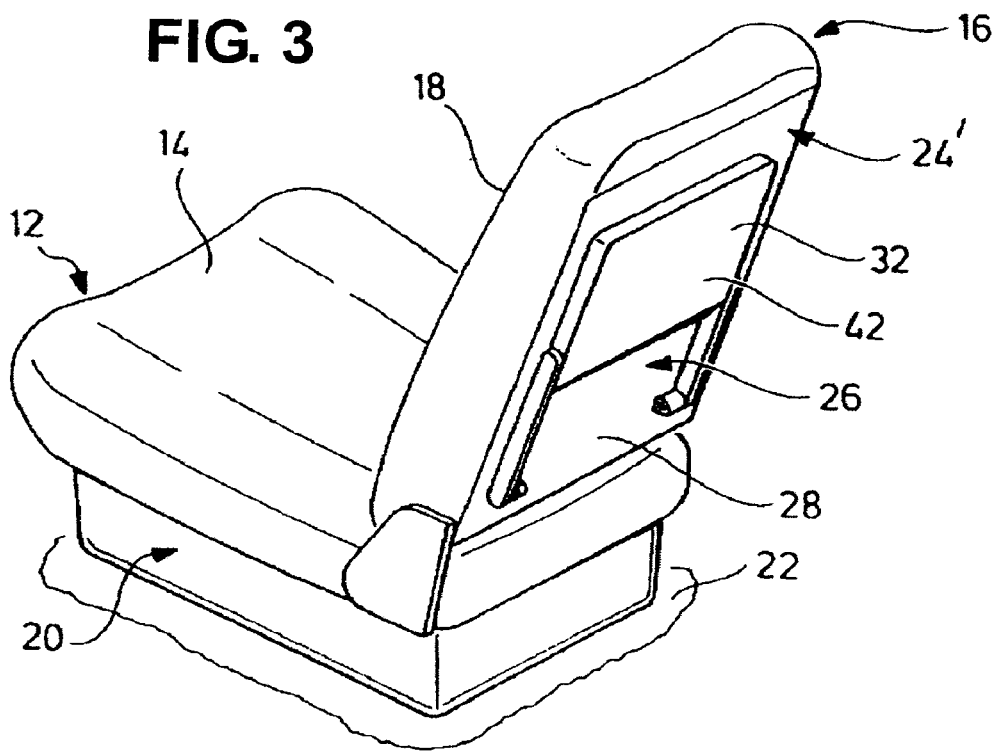
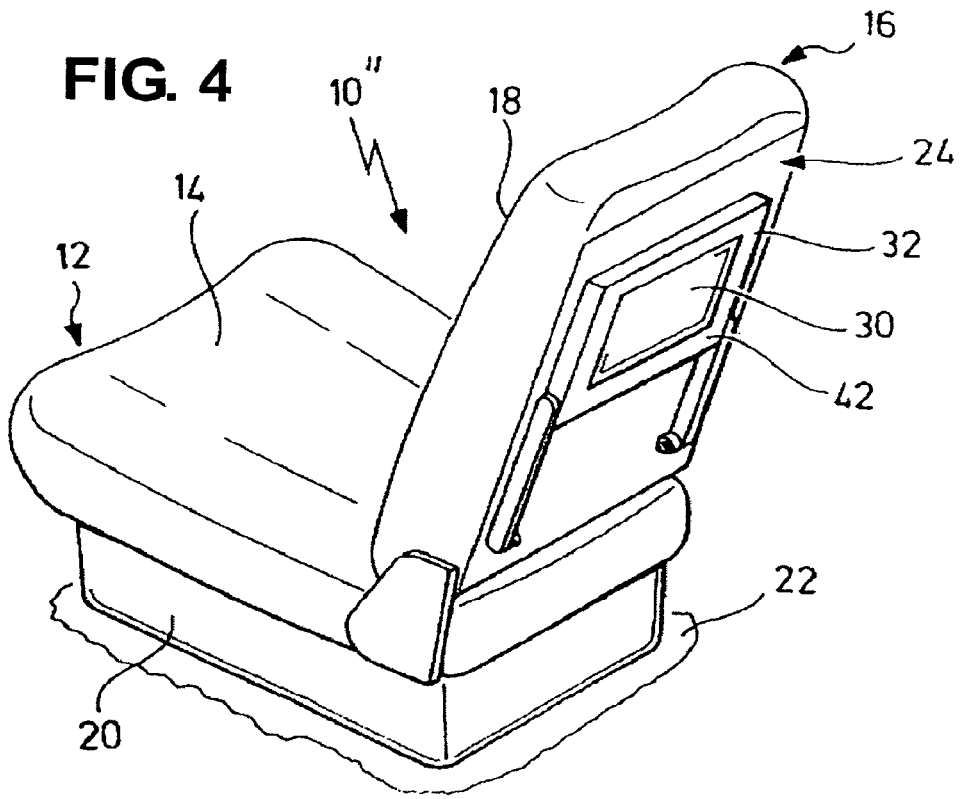

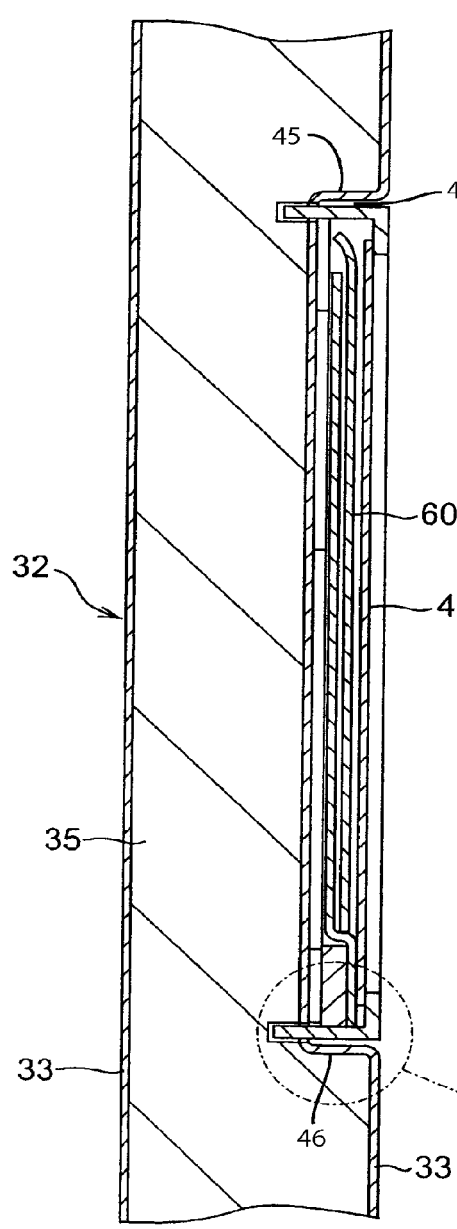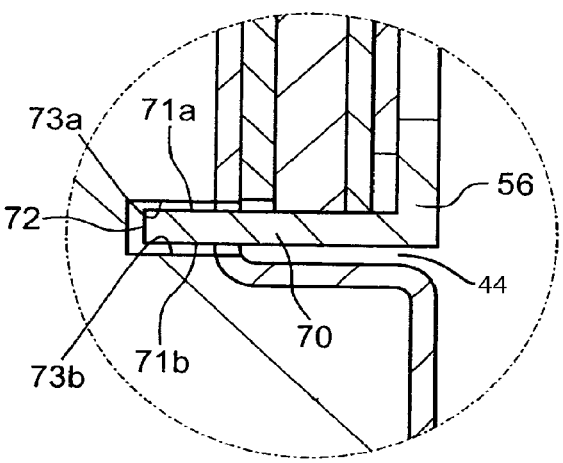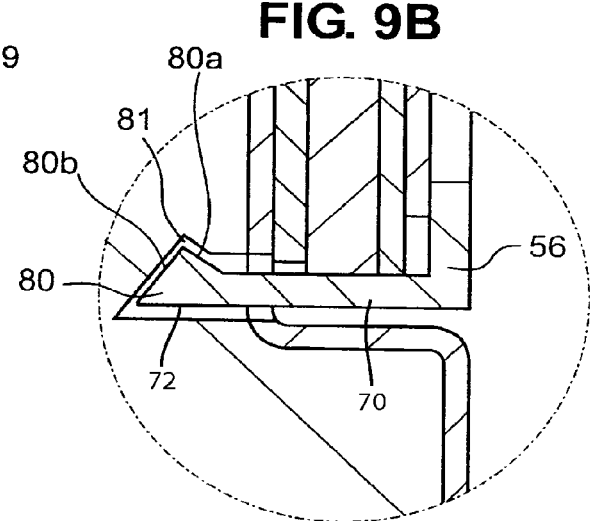

DISPLAY SYSTEM FOR A VEHICLE SEAT

CROSS-REFERENCE TO RELATED APPLICATIONS

This application is the U.S. national stage application of International Application No. PCT/IB2007/002341, filed Apr. 20, 2007, which International application was published on Nov. 1, 2007, as International Publication No. WO 2007/122514 A2 in the English language and on Nov. 1, 2007, as International Publication No. WO 2007/122514 A3 in the English language, which application is incorporated herein by reference. The International application claims priority of International Patent Application No. PCT/EP2006/003693, filed Apr. 21, 2006, and Great Britain Patent Application No. 0705316.8, filed Mar. 20, 2007, which applications are incorporated herein by reference.

FIELD

The present disclosure relates to a display system incorporated into a seat on a vehicle for displaying information, for example displaying advertising information in a seat on an aircraft.

BACKGROUND

In the field of transport, in particular public transport, it is desirable to pass information on to a passenger, for example advertising information. The passenger will often be stationary in the vehicle for long periods and can be easily distracted by information which is displayed in the vehicle.

It is known to arrange advertising information on the outside of the means of transport, or, in the ceiling area of it. Such information has the disadvantage that the passengers are not addressed intensively enough and there may not be sufficient time for a passenger to study the information in detail.

International patent application publication no. WO 99/32016 discloses an advertising system incorporated into a seat on a vehicle consisting of an advertisement which is provided on a sheet that is preferably a thin layer of paper, cardboard, plastic or the like, wherein the advertisement may take the form of any conventional advertising which is typically in the nature of a picture, a drawing; a logo and a written word. The advertisement is mounted in the display position within a recess on a seat, which recess is configured to accept a tray table assembly. The tray table assembly consists of a wall which nests closely within the recess with the tray table assembly in a first position wherein a surface on the wall substantially fully blocks the advertisement as viewed from the rear of the seat. Through a linkage, the tray table assembly is allowed to reposition to a second position wherein a surface facing oppositely to the surface on the wall faces upwardly to provide a support for objects accessible to a passenger seated behind the seat. A repositionable catch maintains the tray table assembly in the first position. The advertisement on the back of this first seat is viewable by a passenger sitting normally and facing forwardly in a seat located behind the first seat. The sheet is provided with a hook and loop type fastener element which allows the fastener element to directly adhere to the cloth layer defining the surface of the seat back. Accordingly the sheet can be placed in the display position, by a simple press fit step without any modification of the seat. The fastener element can be suitably secured to the sheet as by an adhesive or by sewing. Two laterally spaced, vertically extending strips of the fastener element are applied to the sheet. This produces a stable mounting for the sheet, while facilitating its separation from the wall surface when the sheet is to be removed or replaced. This system is constructed so that maintenance crew can simply pull off sheets and effect a replacement thereon in a relatively simple operation.

However, since the advertisement is provided directly on a sheet that is a thin layer of paper, card board, plastic or the like, which is directly adhered to the back of the seat, it is exposed to pollution and damage by the passengers who can easily pull it off mischievously. Cleaning of the sheet is impossible without at the same time soiling and soaking the cloth of the seat back.

SUMMARY

The present disclosure provides a display system for a vehicle seat, comprising:
　a receiving surface including a recess;
　a cover insert adapted to cover and/or fit into the recess;
　wherein the recess comprises a support surface and a slot for receiving a tab located on the cover insert,
　such that an information carrier can be located between the cover insert and the support surface.

The provision of a tab on the cover insert which integrates with the recess ensures that the cover insert is maintained in place over the recess and cannot be removed through mischievous behavior by passengers. Moreover, the tab and slot arrangement permits the advertising system to be cleaned easily without soiling and soaking the advertising sheet and the cloth of the seat. At the same time, the information carrier can be easily replaced, whilst still being protected against pollution and against mischievous manipulation by the passengers.

It might be possible for a person to deform the frame or cover insert with a finger and position a finger, or other implement, such as credit card or eating utensil, on the underside of the cover insert. However, by providing a tab and slot arrangement, it is difficult for the cover insert to be pulled out of the recess in this way at the point where the tab is located.

The cover insert may be, at least in part, transparent or opaque so that the information carrier can be viewed through it. The cover insert may be in the form of a cover plate and may fit over the entire recess, or fit within the recess. The cover insert is specifically adapted to be located in the recess. Alternatively, the cover insert may both cover and extend, in part, into the recess. There is at least one tab on the cover insert, and there may be a plurality of similar tabs located on the cover insert.

The receiving surface may be located on a rear side of a seat, wherein the rear side of the seat is defined as a side which faces away from the back of a person seated normally in the seat and wherein the receiving surface is located in the field of vision of a person viewing the information carrier, for example by being seated in another seat located facing the rear side of the seat.

In one embodiment, the receiving surface may be located on an underside of a pulldown table connected to a rear side of the seat, wherein the pulldown table is moveable between a stowed position and an unstowed position, and wherein the pulldown table is arranged such that the underside of the table can be viewed by a person facing the rear side of the seat when the table is in its stowed position.

In another embodiment, the receiving surface is rigidly fixed to a covering on the rear side of the seat.

In this way, a person situated behind the seat, for example in another seat, will view the information displayed in the information carrier.

The cover insert may comprise a frame and a cover sheet. A section of the cover sheet may be transparent or opaque. The tab may be located on the frame. The frame may have side walls surrounding the cover sheet and at least partly covering the cover sheet, thereby creating an opening for viewing the information carrier located between the cover sheet and the recess. The side walls of the frame may extend around the cover sheet.

The cover insert comprises a sheath including the cover sheet which faces away from the rear side of the seat when the cover insert is located in or over the recess, wherein the sheath comprises a supporting wall between the cover insert and support surface of the recess. In this way, the information carrier can be held securely in the recess.

The supporting wall may be spaced from the cover sheet, and connected thereto except along at least one side where an insertion opening for the introduction of the information carrier is provided. This permits easy insertion and removal of the information carrier.

In one embodiment, the slot may extend in a direction which is not parallel to the receiving surface. This permits the tab to be received in the slot, thereby preventing an edge of the cover insert from being prized away from the recess, for example through manipulation by a passenger. Advantageously, the slot may extend in a direction which is perpendicular to the receiving surface. This permits easy removal of the cover sheet when necessary, but at the same time prevents removal by third-parties, for example by prizing away the edge from the recess with a flat instrument, such as a credit card.

In one embodiment, the slot is located in the support surface.

In one embodiment, the tab is located at least one corner of the cover insert, but in another embodiment, there are two tabs, each located at a corner of the cover insert. It is generally easier to prize away an edge of the contact plate from the recess at a corner of the contact plate. Hence, the provision of a tab surrounding the corner of the contact plate ensures that this cannot occur.

In such an embodiment, it is advantageous for the tab to comprise a first wall section and a second wall section, wherein the first and second wall sections are joined at the at least one corner of the cover insert and extend along different edges of the cover insert.

The first and second wall sections extend in directions which are perpendicular to each other. The tab comprises opposing engaging surfaces which are contained at least partially within the slot when the cover insert is in place in or over the recess. This ensures that leverage cannot be made on an edge of the tab because the edge of tab is inaccessible to any implement that might be used to prize the cover insert away from the recess.

For the purposes of terminology, the tab may be referred to as a first primary tab and the slot as a first primary slot.

The display system may further comprise:

a second primary tab; and a second primary slot in the recess for receiving the second primary tab.

The second primary slot extends in a direction which is not parallel to the receiving surface. For example, the second primary slot extends in a direction which is perpendicular to the receiving surface. The second primary slot is located in the support surface.

In one embodiment of the present invention, the display system further comprises:

a secondary tab; and a secondary slot in the recess for receiving the second primary tab, wherein the secondary slot extends in a direction which is not perpendicular to the receiving surface.

Any number of additional primary or secondary tabs may be provided. However, for the purposes of the discussion which follows, only two such primary tabs and one such secondary tab are described.

The secondary tab is therefore generally flat with an engaging surface which is parallel to the display surface of the cover insert (and is thus parallel to the rear-side of the seat or underside of the table), either as an extension of the cover insert itself or it may be set back from the display surface via a dog leg arrangement. Alternatively, the tab may be arranged on the frame as an extension of the frame, but is still parallel to the display surface of the cover insert. The tab therefore extends out of the cover insert or frame in a direction which is parallel to the cover insert and frame.

In one embodiment, the secondary slot extends in a direction which is parallel to the receiving surface. The primary tabs and corresponding primary slots may extend in a direction which is between +10 degrees or −10 degrees each side of a direction which is perpendicular to the receiving surface. The secondary tab and corresponding secondary slot may extend in a direction which is between +10 degrees or −10 degrees each side of a direction which is parallel to the receiving surface. In another embodiment, the primary tabs and corresponding slots may extend in a direction which is any of +/−1, 2, 3, 4, 5, 6, 7, 8, 9, 10, 15, 20, 30, 40 or 45 degrees each side of a direction which is perpendicular to the receiving surface. The secondary tab and corresponding secondary slot may extend in a direction which is +/−1, 2, 3, 4, 5, 6, 7, 8, 9, 10, 15, 20, 30, 40 or 45 degrees each side of a direction which is parallel to the receiving surface.

The secondary tab may be in the form of a flange along one edge of the cover insert.

The combination of one or more primary tabs which extend in a direction which is perpendicular (or near to perpendicular) to the receiving surface and a secondary tab which extends in a direction which is parallel (or near to parallel) to the receiving surface ensures that the cover insert is held securely in place, without being easily removable through mischievous behavior by third parties, but can still be easily removed when it is necessary to clean and/or replace the information carrier. This can be achieved by using a sucker positioned on the cover insert near an edge which is opposite the secondary tab.

In one embodiment, the first and second primary tabs are located on corners of the cover sheet having a common edge on the cover sheet. This prevents the corners of the cover sheet from being prized away from the receiving surface.

In one embodiment, the common edge is opposite an edge of the cover sheet on which the secondary tab is located.

In one embodiment, the recess comprises at least one side wall and the slot is located in the at least one side wall.

The recess may comprise an upper side wall, two lateral side walls and a lower side wall, wherein the upper side wall is located vertically above the lower side wall with respect to the ground and the two lateral side walls are located between the upper side wall and the lower side wall. The recess and cover insert may therefore be rectangular or square in shape.

The slot may be located in the upper side wall. In this way, when the cover insert is in place in or over the recess, the engaging surface of the tab is juxtaposed to and contacts with an internal surface of the slot which prevents the upper side being easily removed from the recess. The tab may comprise an engaging surface for engaging an internal surface of the slot. Moreover, any liquid which is wiped across the cover sheet cannot move under gravity into the area between the recess and cover insert, thereby preventing damage to the displayed information.

In one embodiment, the tab is connected along at least part of one edge of the cover insert. Alternatively, the tab may extend along the entire length of one edge of the cover insert. In one embodiment, the engaging surface is not perpendicular to a display surface of the cover insert. For example, the engaging surface is parallel to the display surface.

In one embodiment, the engaging surface is separated from the cover insert by a separation surface which extends in a direction which is not parallel to the display surface of the cover sheet, for example a perpendicular direction. The tab and cover insert may be joined in a dog-leg arrangement. This permits the display surface of the cover insert to be maintained flush against the receiving surface and also provides more secure engagement between the tab and the slot.

In one embodiment, the display system further comprises at least one fastening means or pair of fastener elements located on one or both of the cover insert and support surface for fastening the cover insert into or over the recess. Any reusable fastening means may be used which provides a temporary, yet secure, attachment between the cover insert and the recess.

The fastening means may comprise strips of cooperating hook and loop fastener elements, for example VELCRO® fastener elements, secured to the cover insert and to corresponding areas of the supporting surface of the recess.

In one embodiment, the tab is in the form of a protrusion which extends in a substantially parallel direction with respect to a display surface of the cover insert and away from a centre of the cover insert and the slot is in the form of an aperture located at least one corner of the recess and the protrusion is located at a corner of the cover insert. For example, the protrusion comprises two abutment surfaces which are in a plane which is perpendicular to the display surface. This form of protrusion prevents an implement (e.g. a credit card or eating utensil) from being slid around a corner of the cover insert between a side wall of the recess and In a second aspect of the present disclosure, there is provided a method for removing a cover insert of a display system for a vehicle seat from a recess, comprising:

applying a sucker to a display surface of the cover insert; and removing the cover insert from the recess with the sucker.

The step of removing may comprise: pulling the cover sheet with the sucker in a direction which is substantially perpendicular to the display surface until a tab which extends into the recess from the display insert is no longer located in the recess, then subsequently sliding the cover insert with the sucker in a direction which is substantially parallel to the display surface.

In a third aspect of the disclosure, there is provided an advertising system incorporated into a seat on a vehicle in that it comprises a seat cushion, a seat back, a supporting frame and a rear-side covering for the seat back, said seat back being provided with one of a recess in said rear-side covering or a pulldown table which is articulatedly connected to the seat back and provided with a recess on the side facing away from the seat back in the upright, folded away position of the pulldown table; said recess comprising an upper side wall, two lateral side walls and a lower side wall as well as a bottom surface; the advertising system comprising in addition a receiving means for an advertisement carrier in the form of a sheath consisting of a transparent cover plate, facing away from the seat back or the pulldown table, and a supporting wall spaced from the cover plate and sealed thereto except along the upper side where an insertion opening for the introduction of the advertisement carrier is provided; said tab or flange being part of one of the cover plate or of a frame surrounding said cover plate and being sealed thereto; said tab or flange extending along and above said insertion opening, whereby when said tab or flange is introduced into said slot bottom surface of said recess by any well-known means, said receiving means is nested in said recess and the advertisement carrier is protected against pollution, damage and mischievous manipulation by the passengers.

Due to the arrangement of the advertisement carrier in the receiving means in the form of a sheath being nested in a recess of said seat back or of the pulldown table with said tab or flange being introduced into the slot in the upper wall of the recess, the advertisement carrier is completely inaccessible to manipulation, pollution, damage by the passenger and is essentially fluid tight, so that cleaning of the advertising system is possible without soiling and/or soaking the seat back and/or the advertisement carrier.

The supporting wall of said receiving means may consist of a central depression, the size of which corresponding to the size of the advertisement carrier and a flange surrounding said central depression at three sides, except at the side where the insertion opening is provided, by cutting off the corresponding flange part, said flange being seated to the back side of said cover plate and receiving an adhesion means for releasably adhering said receiving means in said recess.

One embodiment for example, provides for said frame having side walls, surrounding said cover plate, being opaque and also partly covering said cover plate, thereby creating an opening for viewing the advertisement carrier inserted underneath said cover plate, said side walls of said frame sealingly extending around said cover plate and the flange of said supporting wall.

A further embodiment provides for adhesion means consisting of strips of cooperating hook and loop fastener elements, secured to the flange of said supporting wall and to corresponding areas of said surface of said recess by an adhesive or by sewing. In this way the receiving means is fastened in said recess by means of the upper tab or flange introduced into the slot of the recess and by the hook and loop fastener elements, the surface of the frame supporting the cover plate being flush with the rear-side covering of the seat or the underside of the pulldown table and inaccessible to manipulation by the passengers.

In order to facilitate insertion and removal of the advertisement carrier, the supporting wall of the receiving means may comprise a central opening and/or a cut out at the edge adjacent to the insertion opening for gripping said advertisement carrier during insertion and removal of the same,

BRIEF DESCRIPTION OF THE DRAWINGS

Other objects and advantages will be become apparent upon reading the following description and upon reference to the drawings, in which;

FIG. 3 is a perspective view similar to FIG. 2 of the alternative embodiment of FIG. 2;

FIG. 4 is a perspective view similar to FIG. 1 of a further alternative embodiment of the present disclosure;

FIG. 7A is an enlarged sectional view of the cover insert shown in FIG. 7;

FIG. 9 is a sectional illustration along line VIII-VIII in FIG. 8;

FIG. 9A is an enlarged sectional view of the cover insert shown in FIG. 9;

FIG. 9B is an enlarged sectional view of an alternative arrangement of the cover insert shown in FIG. 9;

The present disclosure is not intended to limit the invention. On the contrary, it is intended to cover all alternatives, modifications and equivalents, as may be included within the spirit and scope of the invention as defined by the appended claims.

DETAILED DESCRIPTION

Figure 1:
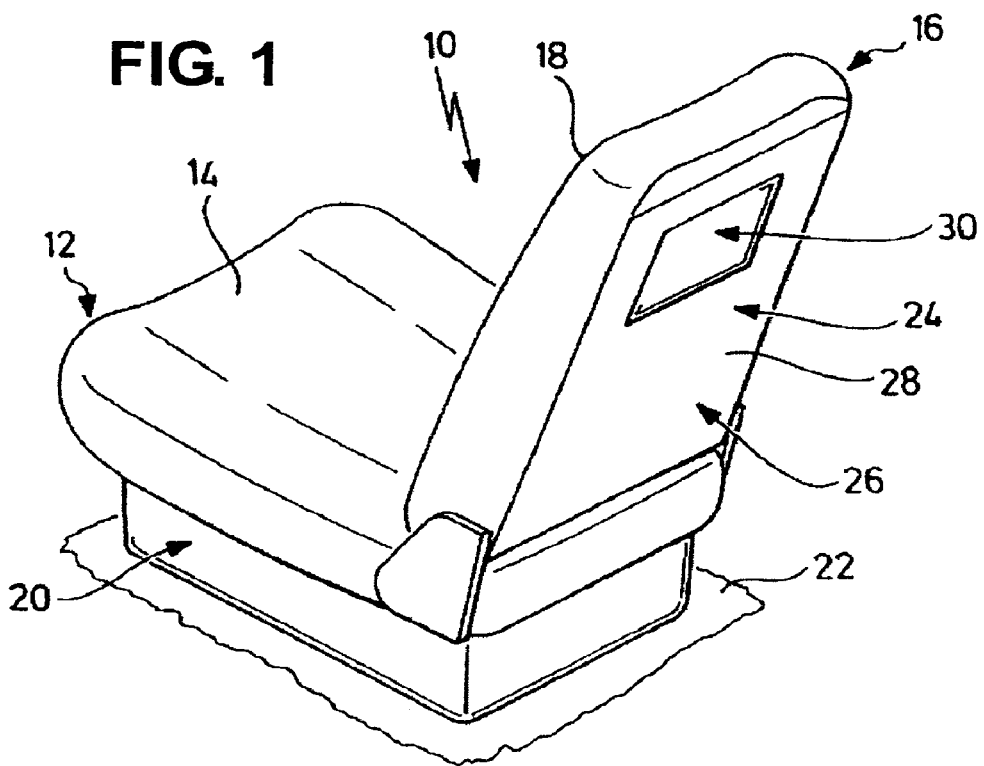
FIG. 1 is a perspective view of a display system according to an embodiment of the disclosure.

One embodiment is shown in FIG. 1. A seat comprises the display system designated as a whole as 10, in particular a seat for a commercial airplane, comprises a seat cushion 12, which has a seat surface 14, as well as a seat back 16 with a seat back surface 18.

The seat cushion 12 thereby rests on a supporting frame 20, with which the entire seat 10 is supported on a floor surface 22.

The seat back 16 is provided on the side opposite the seat back surface 18 with a rear-side covering 24 which, in the case of the first embodiment, has a covering plate 26 with a surface 28 facing a person located behind the seat 10.

The covering plate 26 thereby bears in the center in its upper half facing away from the supporting frame 20, a display carrier 30 which is likewise visible to a person located, in particular sitting, behind the seat 10. This display carrier 30 will be described in detail in the following form.

Figure 2:
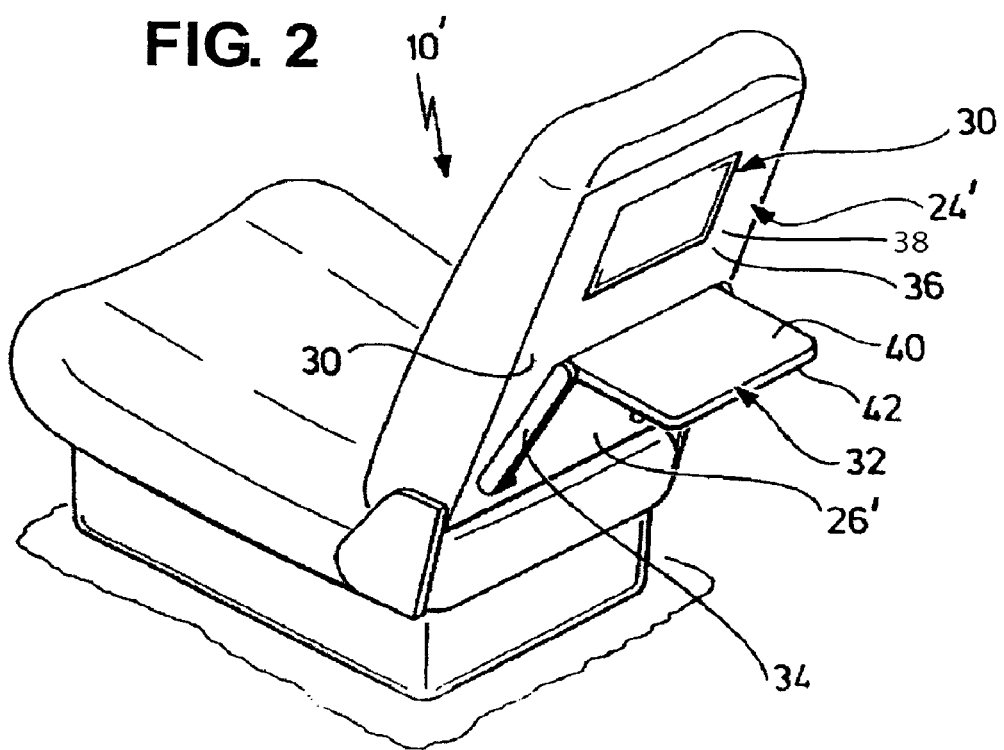
FIG. 2 is a perspective view of the display system similar to FIG. 1 in an alternative embodiment of the present disclosure.

In a variation of a seat comprising the display system designated as a whole as 10', the covering 24' comprises a covering plate 26' with a pulldown table 32 which is articulatedly connected to the covering plate 26' via arms 34, the pulldown table 32 being tiltable between a pulled down position, illustrated in FIG. 2 and a folded away position, illustrated in FIG. 3. In order to accommodate the pulldown table 32 in its folded away position, the covering plate 26' is provided with a recessed region 36, in which the pulldown table 32 is located in its folded away position illustrated in FIG. 3.

The recessed region 36 has, for its part, a surface 38 which faces a person using the pulldown table 32 when the pulldown table 32 is in the pulled down position, and in the folded away position of the pulldown table 32 faces an upper side 40 of the pulldown table so that in this position the underside 42 of the pulldown table 32 faces the person located behind the seat 10'.

In the alternative variation 10' of the seat comprising the system, the carrier 30 is arranged on the surface 38 of the region 36 and likewise in an upper half thereof.

In a further variation of a seat 10" comprising the display system, illustrated in FIG. 4, the display carrier 30 is not arranged in the recess 36, but on the underside 42 of the pulldown table 32 so that the carrier is visible in the folded away state of the pulldown table 32.

FIGS. 5 to 7 and 7A depict a first embodiment of a cover insert for fitting into and\or covering the recess.

Figure 7:
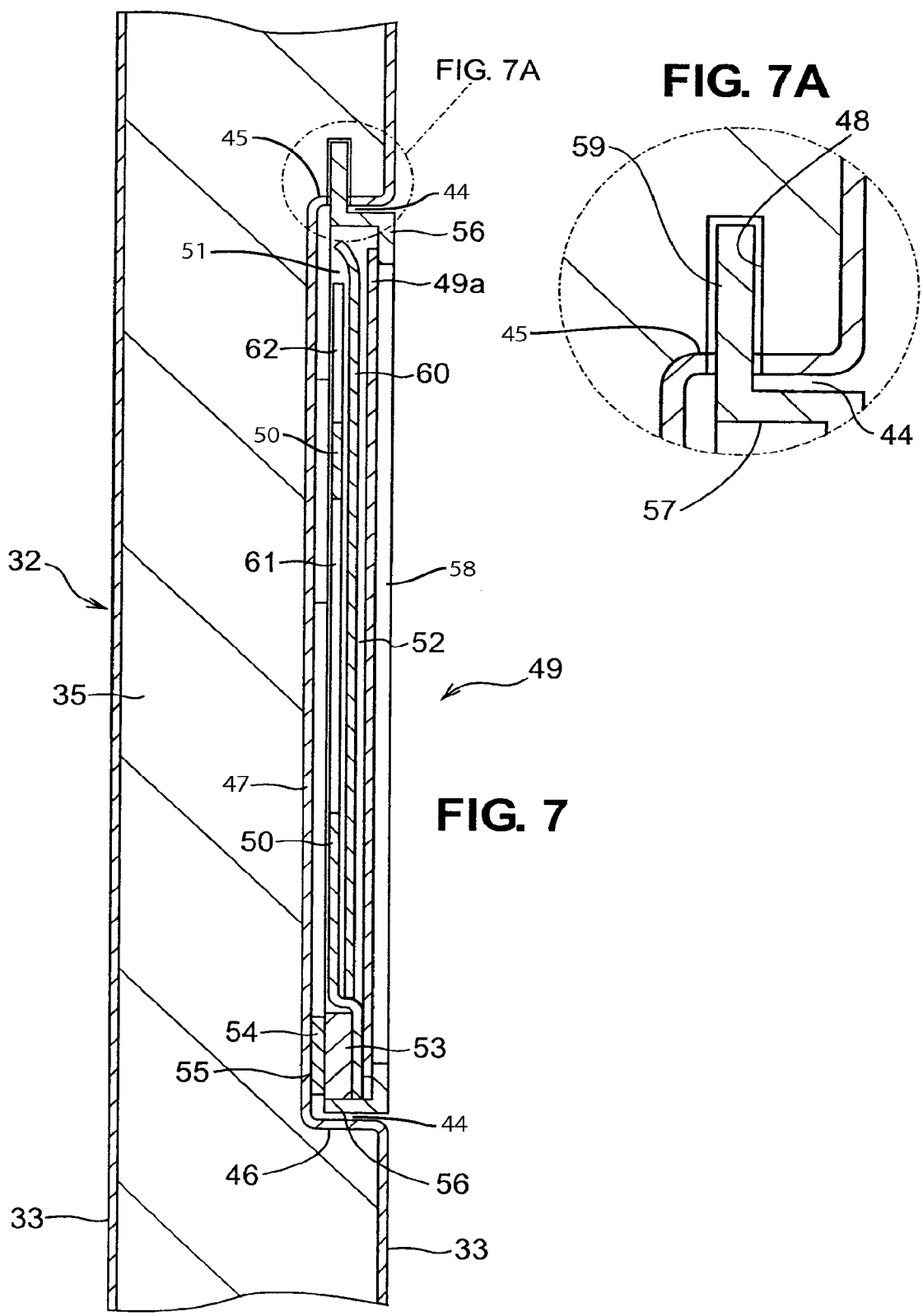
FIG. 7 is a sectional view of the cover insert of FIG. 5 along line VII-VII in FIG. 6.

In the first embodiment of the present invention shown in FIGS. 7 and 7A, the pulldown table is shown only in part and comprises side walls 33 of plastic sheet and a filling 35 of foamed plastic. In one of the side walls 33, a recess 44 is provided comprising an upper side wall 45, a lower side wall 46, not visible side walls and a supporting surface 47 (or back wall). In the upper side wall 45 as well as in the adjacent filling of foamed plastic, a slot 48 is arranged, extending over the entire length of the upper side wall 45.

The purpose of the recess 44 is to receive a receiving means for an information carrier 60 in the form of a cover insert 49 having a sheath comprising a transparent cover sheet 49a, facing away from the seat back 16 or the pulldown table 32, and of a supporting wall 50 spaced from the cover sheet 49a and sealed thereto except along the upper side where an insertion opening 51 for the introduction of the information carrier 60 is provided.

Figure 5:
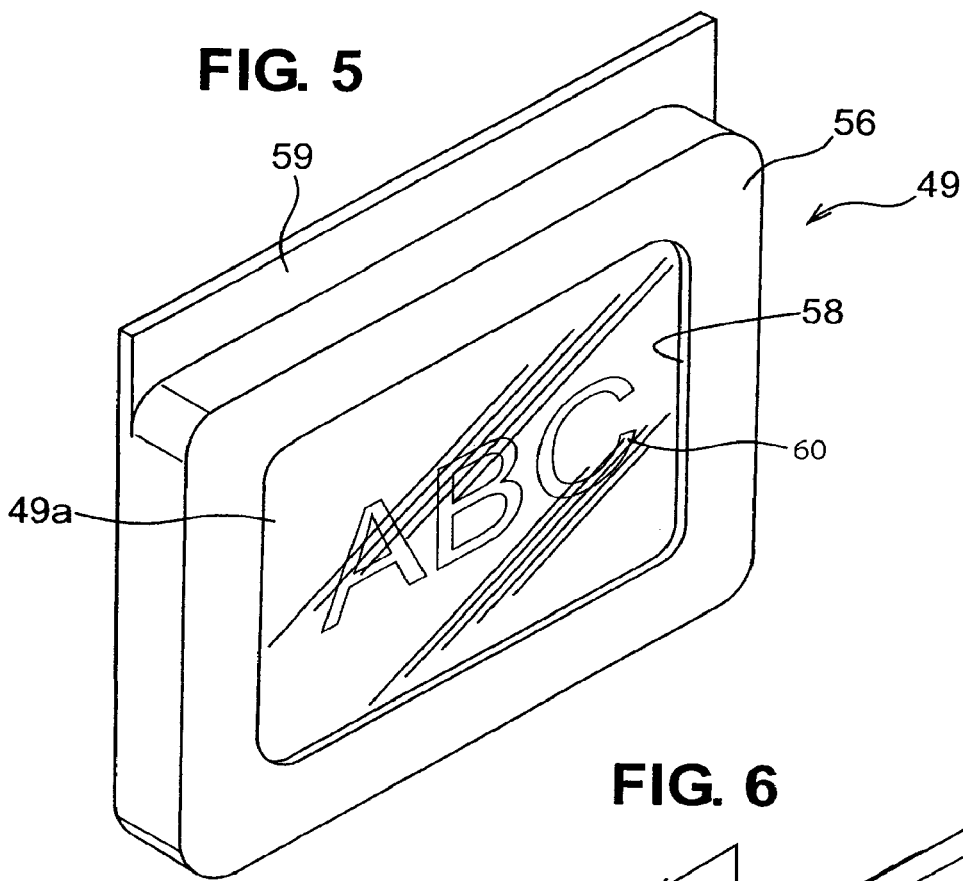
FIG. 5 is a perspective front view of a cover insert for a display system according to a first embodiment of the present disclosure.
Figure 6:
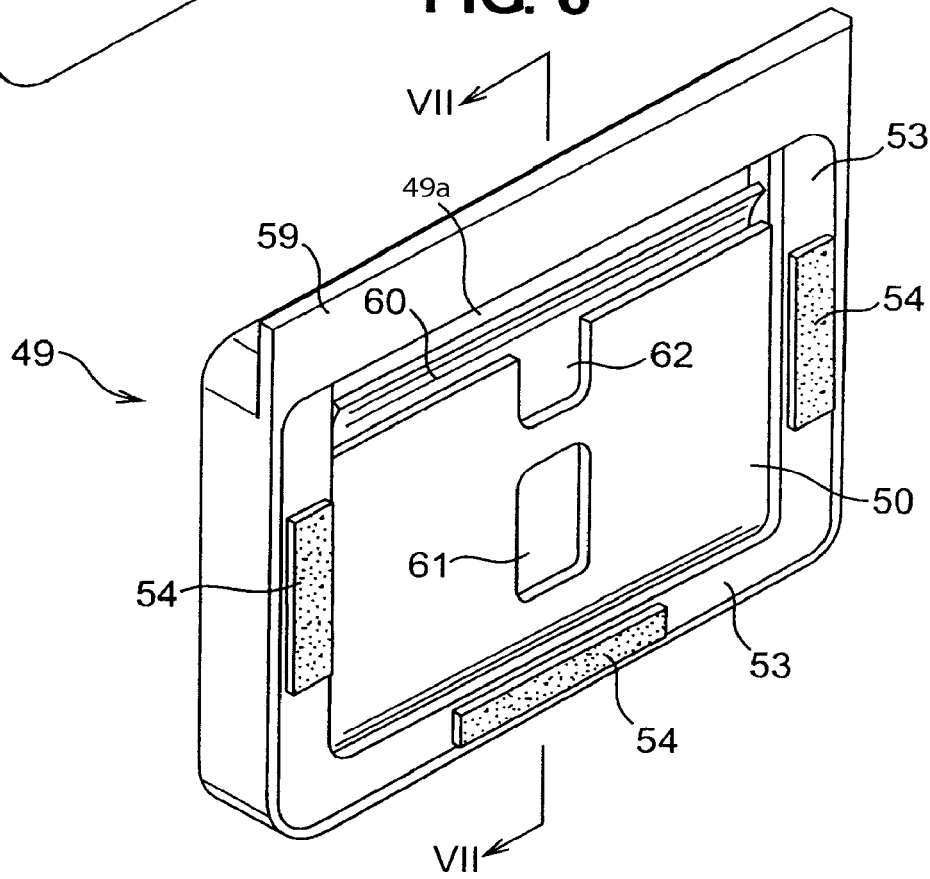
FIG. 6 is a rear plan view of the cover insert for the display system of the embodiment shown in FIG. 5.

A tab or flange 59 may be an integral part of the cover insert 49 and is preferably, according to the embodiment shown in FIGS. 5 to 7, part of a frame 56 surrounding and partly covering said cover insert 49 and being sealed thereto. In this arrangement, the tab 59 is formed in a dog-leg arrangement and is set back from the front of the frame 56 by separation surface 57. The separation surface 57 extends in a perpendicular direction from the front surface of the frame into the recess 44 (when the cover insert 49 is located in the recess 44). The tab 59 is connected to the end of the separation surface 57 and extends in a non-perpendicular direction with respect to the front surface of the cover insert 49.

In this first embodiment, the tab 59 acts to hold the upper edge of the cover insert 49 in the recess 44. This is because it is parallel to the supporting surface 47 when in position in or over the recess 44.

An opening 58 is provided in the frame 56 so that the information carrier 30 may be viewed through said opening 58 and the transparent coversheet 49a.

The supporting wall 50 consists of a central depression 52, the size of which corresponds to the size of the information carrier 60, and of a flange 53 surrounding said central depression 52 at three sides, except at the side where the insertion opening 51 is provided by cutting off the corresponding flange part. The flange 53 is sealed to the back side of the cover insert 49 and receives an adhesion means in the form of strips 54, 55 of cooperating hook and loop fastener elements secured to the flange 53 of said supporting wall 50 and to corresponding areas of said surface 47 of said recess 44 by an adhesive or by sewing.

The supporting wall 50 comprises a central opening 61 and a cut out 62 at the edge adjacent to the insertion opening 51 for gripping the information carrier 60 during insertion and removal of same.

Although not depicted in the drawings, the cover insert 49 may comprise a second tab, similar to tab 59 located on an opposite edge to the cover insert 49. Likewise, the recess 44 comprises a second slot similar to the slot 48 along its lower edge. The second slot is adapted to receive the second tab. In this case, the cover insert 49 is semi-rigid and sufficiently flexible to allow the insert 49 to be deformed so that both tab 59 and the second tab can be inserted in the corresponding slots, thereby holding the cover insert 49 within the recess 44.

FIGS. 8, 9, 9A and 9B depict a second embodiment of a cover insert for fitting into and\or covering the recess.

Figure 8:
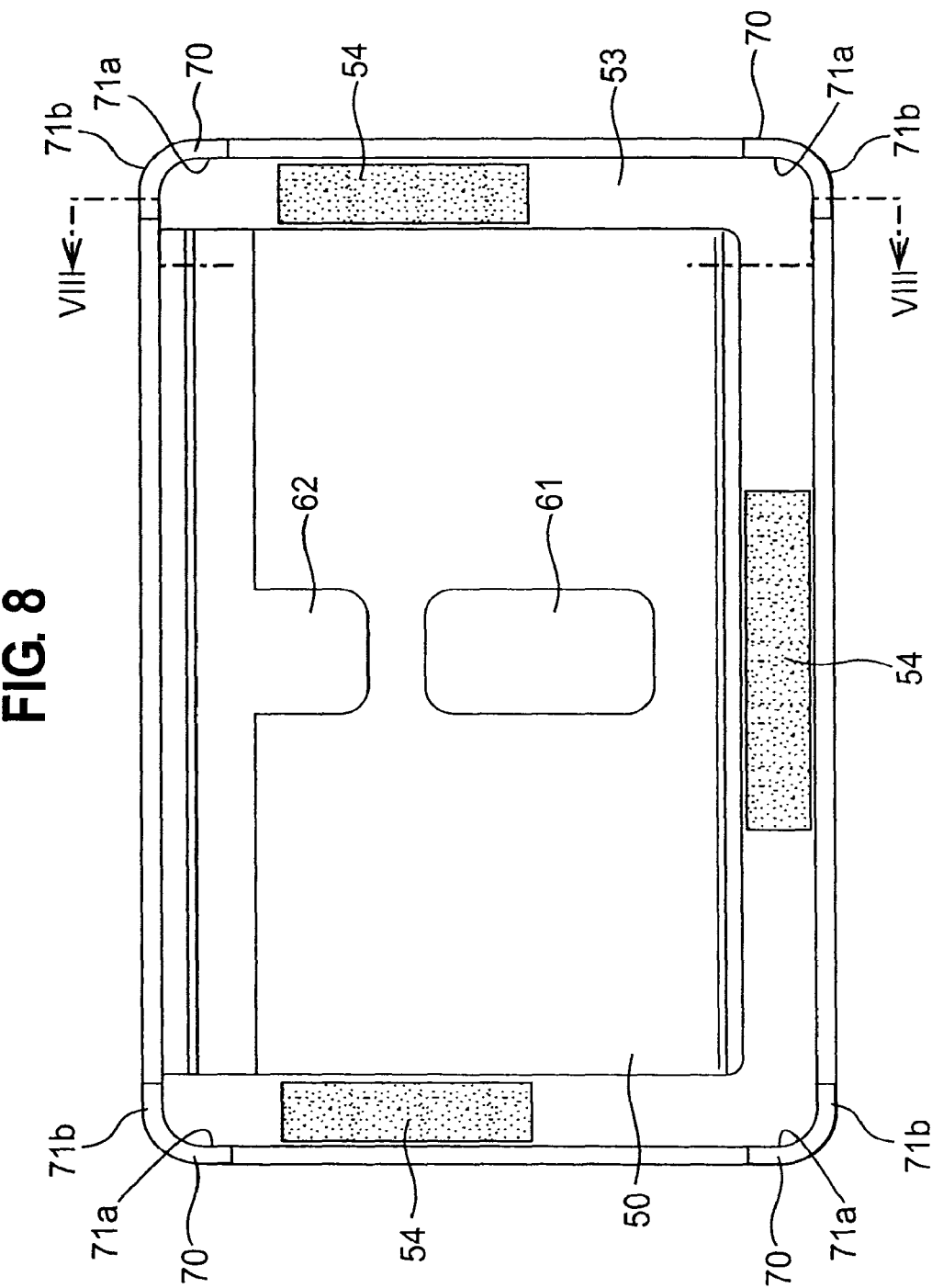
FIG. 8 is a back plan view of the cover insert for a display system according to a second embodiment of the present disclosure.

In the second embodiment shown in FIGS. 8, 9 and 9A, tabs 70 are provided at each of the four corners of the cover insert 49. The tabs 70 extend around each corner and outwards from the cover insert in a direction which is substantially perpendicular to the main surface of the cover insert 49 (and the supporting surface 47 of the recess 44 when the cover insert 49 is in place in the recess 44). When in position, the tabs 70 are located in corresponding slots 72 contained in the recess 44 and in the foamed plastic. The slots 72 are located at corresponding corners of the recess 44 and extend, in a substantially perpendicular direction with respect to the supporting surface 47, into the foamed plastic. The tabs 70 have opposing engaging surfaces 71a, 71b which correspond to corresponding engaging surfaces 73a, 73b of the slots 72.

A variation to the second embodiment is shown in FIG. 9B in which a protrusion 80 is located on an end of the tab 70. A corresponding aperture 81 is located in the recess 44. The aperture 81 is shaped and dimensioned to receive the protrusion 80 when the tab 70 is located in the slot 72. The protrusion is formed on a side of the tab 70 which faces away from the side walls 45, 46 of the recess 44. The protrusion is formed with cam surfaces 80a, 80b along with the aperture 81 so that it can be easily inserted and removed when the tab 70 is inserted into the slot 72. On removal of the cover insert 49 from the recess 44, the protrusion 80 acts to prevent removal of the insert 49 until a sufficient extraction force is applied to the cover insert 49. At this point, the tab 70 has deformed sufficiently under action of a cam force against cam surface 80b so that the protrusion no longer resides in the aperture 81. The tab 70 can then be extracted from the slot 71 as the cover plate 49 is removed from the recess 44.

Figure 10:
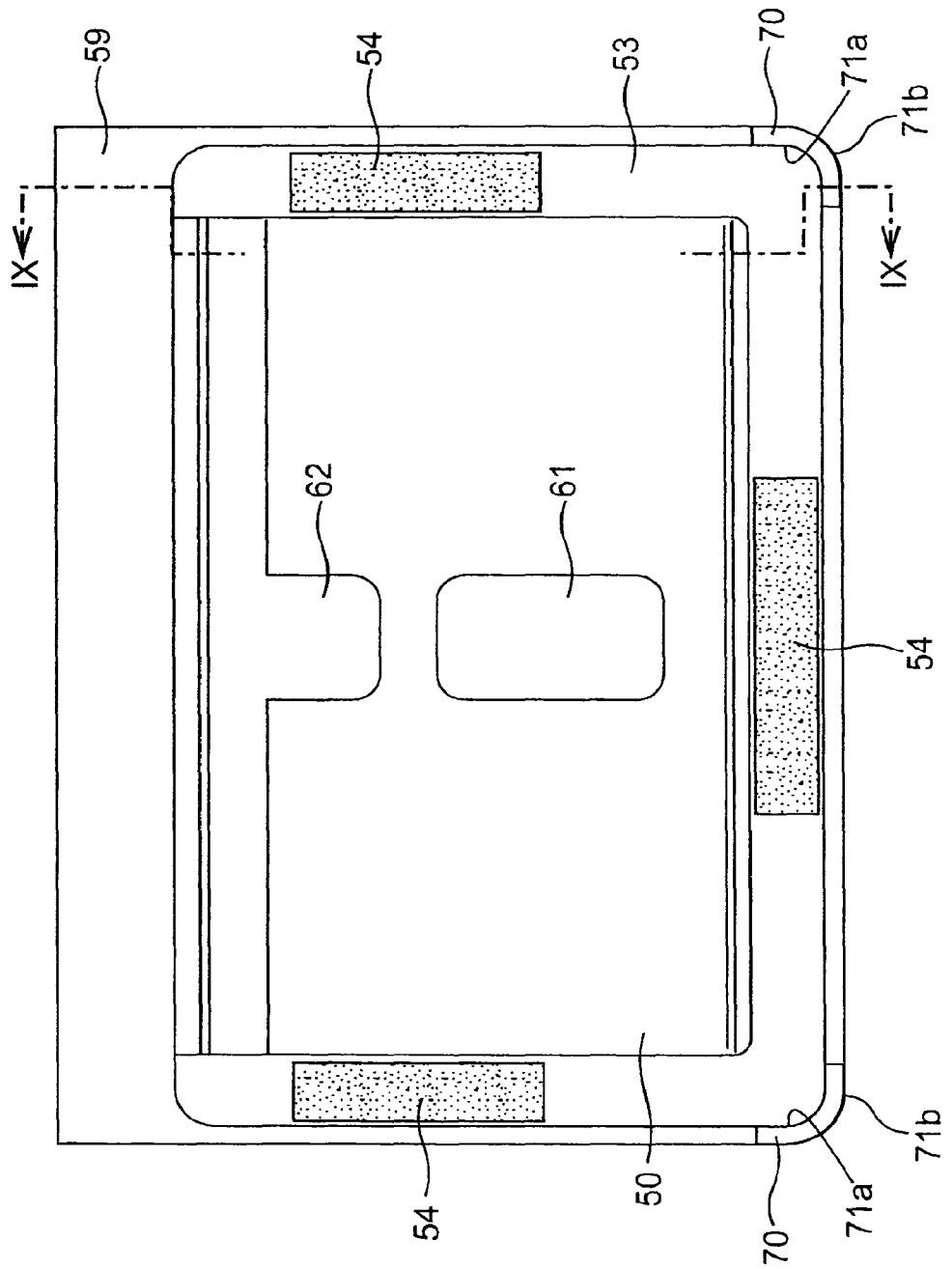
FIG. 10 is a rear plan view of a cover insert for a display system according to a third embodiment of the present invention.
Figure 11:
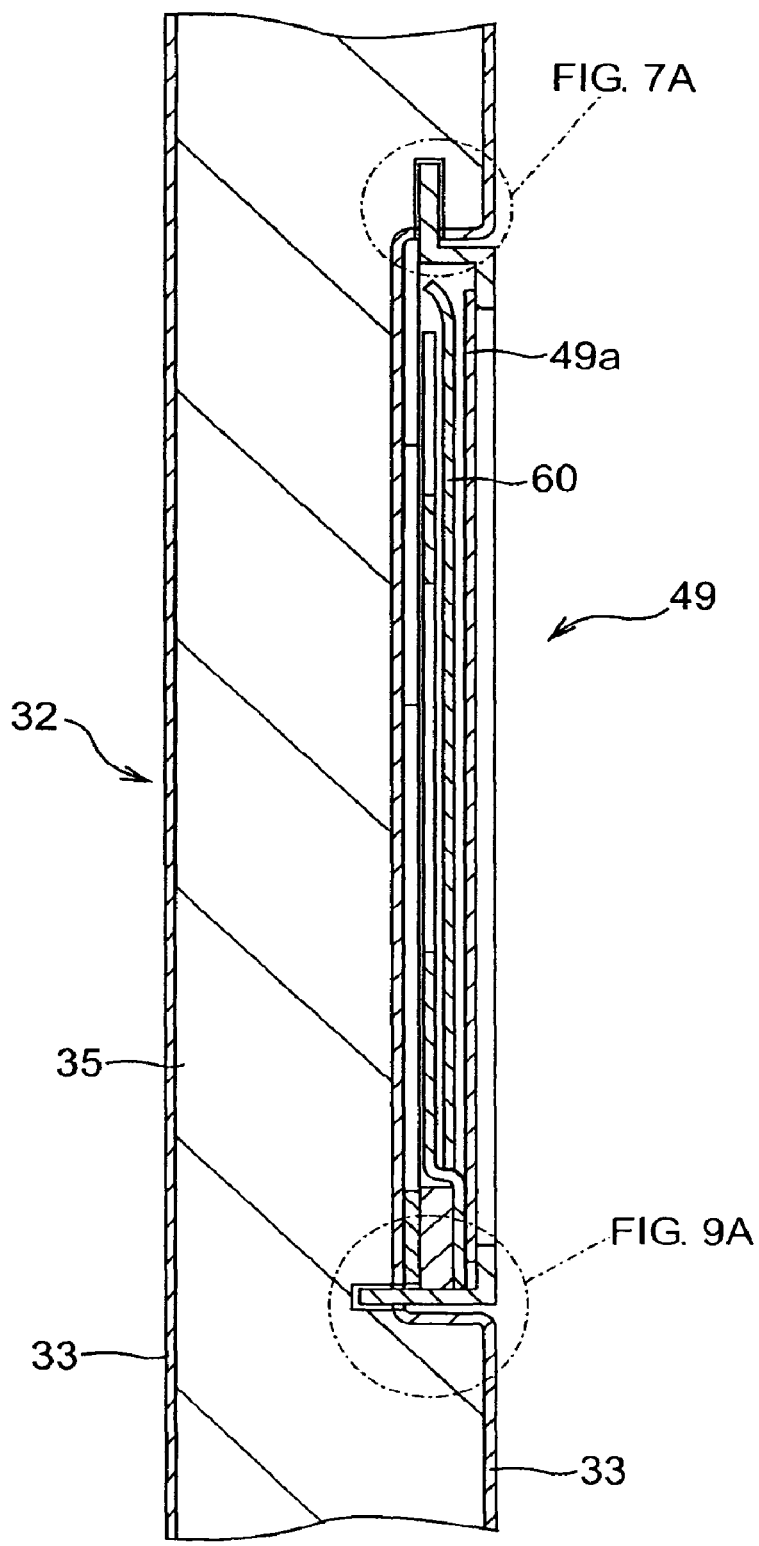
FIG. 11 is a sectional view of the cover insert along line IX-IX in FIG. 10.

FIGS. 10 and 11 in conjunction with FIGS. 7A and 9A depict a third embodiment of a cover insert for fitting into and\or covering the recess.

In a third embodiment of the present disclosure shown in FIGS. 10 and 11, tabs 70 are referred to as primary tabs 70 and slot 72 is referred to as a primary slot 72. There are two primary tabs 70, located at the corners of the lower edge of the cover insert 49. Tab 59 is referred to as a secondary tab 59 and slot 48 is referred to as a secondary slot 48. In this embodiment, the secondary tab 59 acts to hold the upper edge of the cover insert 49 in the recess 44. This is because it is parallel to the supporting surface 47. The primary tabs 70 prevent a person being able to prize the edge of the cover insert 49 at its lower corners out of the recess 44, for example by using an implement such as a credit card or eating utensil. This is achieved by engagement of the tabs' engaging surfaces 71a, 71b with the corresponding engaging surfaces 73a, 73b of the slots 72 when any attempt is made to lever or prize a corner of the cover insert 49 away from the recess 44, for example by deforming the cover insert 49 at its corner.

Figure 12:
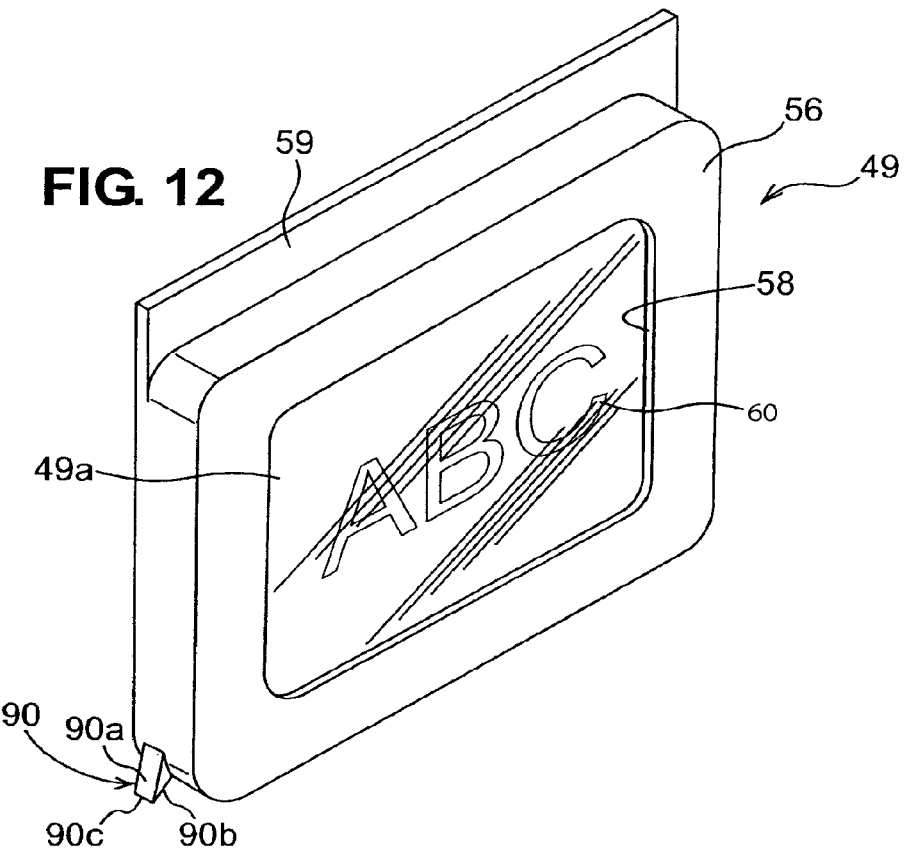
FIG. 12 is a perspective back view of the cover insert for a display system according to a fourth embodiment of the present invention.
Figure 12A:
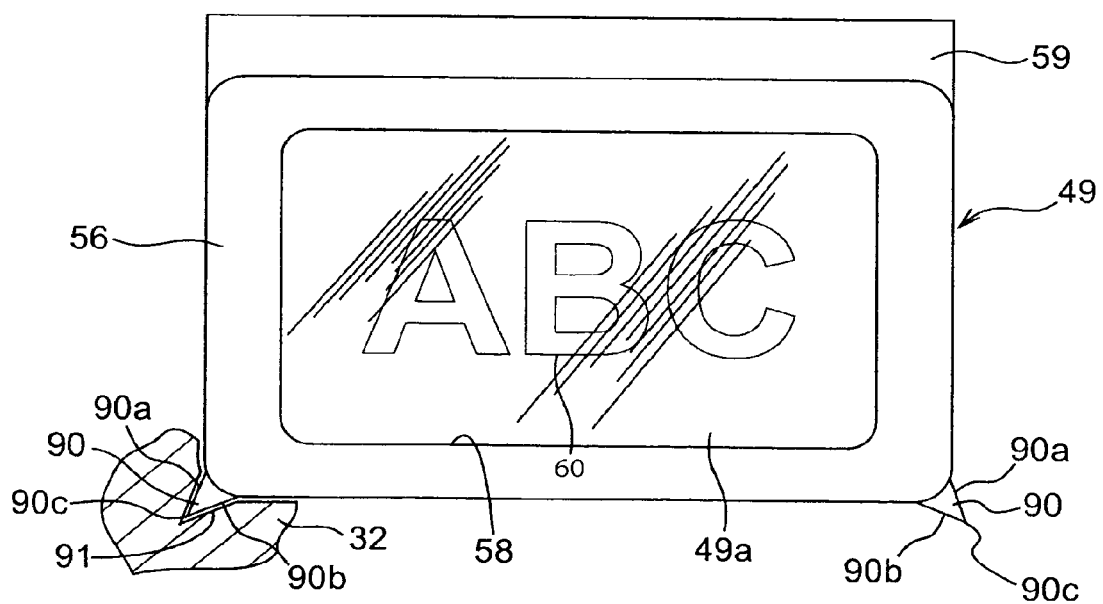
FIG. 12A is a front plan view of the cover insert of FIG. 12.

FIGS. 12 and 12A depict a fourth embodiment of a cover insert for fitting into and\or covering the recess.

An alternative form of tab in the form of a protrusion 90 is located at one or more (or even all four) corners of the cover insert 49. In the depicted embodiment shown in FIG. 12, the protrusion is located at two corners on an edge opposing the edge along which the tab 59 is located. An aperture 91 corresponding to each protrusion 90 is located at one or more corners of the recess 44 located in the table 32. The aperture 91 is shaped and dimensioned to receive the protrusion 90 when the cover insert 49 is located in the recess 44. The protrusion 90 has two side surfaces 90a, 90b which are in a plane which is not parallel to the front surface of the cover plate 49, preferably perpendicular to it. The two surfaces 90a and 90b join at a point 90c. The protrusion 90 extends away from the center of the cover insert 49 and acts to prevent an implement (e.g. an eating utensil or credit card) from being slid around the outside of the cover insert 49 between the cover insert 49 and the side wall of the recess. This increases the difficulty for removing the cover insert 49.

Figure 13:
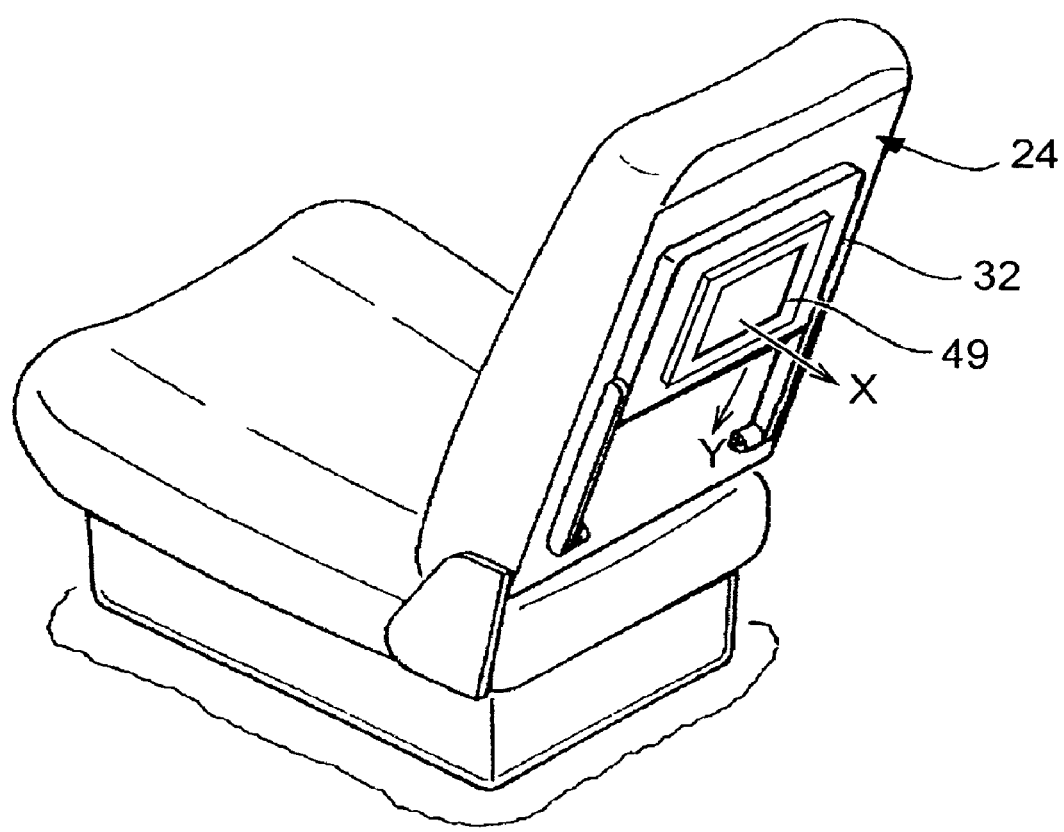
FIG. 13 is a perspective view of a display system.

In order to remove the cover insert 49 of any one of the first to third embodiments, the cover insert must first be pulled away from the recess in a direction which is perpendicular (or near to perpendicular) to the supporting surface 47 near the location of the primary tabs 70 on the cover insert 49. The cover insert 49 must then be pulled in a direction which is parallel (or near to parallel) to the supporting surface 47, i.e. in a direction downwards so that the secondary tab 59 is pulled out of the secondary slot 48. This motion can be achieved with the aid of a sucker which can be placed on the cover insert 49 near the edge of the cover insert 49 which has the tabs 59. Movement of the sucker in an outwards and then a downwards motion (with respect to the recess 44) causes the cover insert 49 to become released from recess 44. This movement is shown in FIG. 13 with the arrows X and Y.

It will of course be understood that the present invention has been described above purely by way of example and modifications of detail can be made within the scope of the invention.

Figure 14:
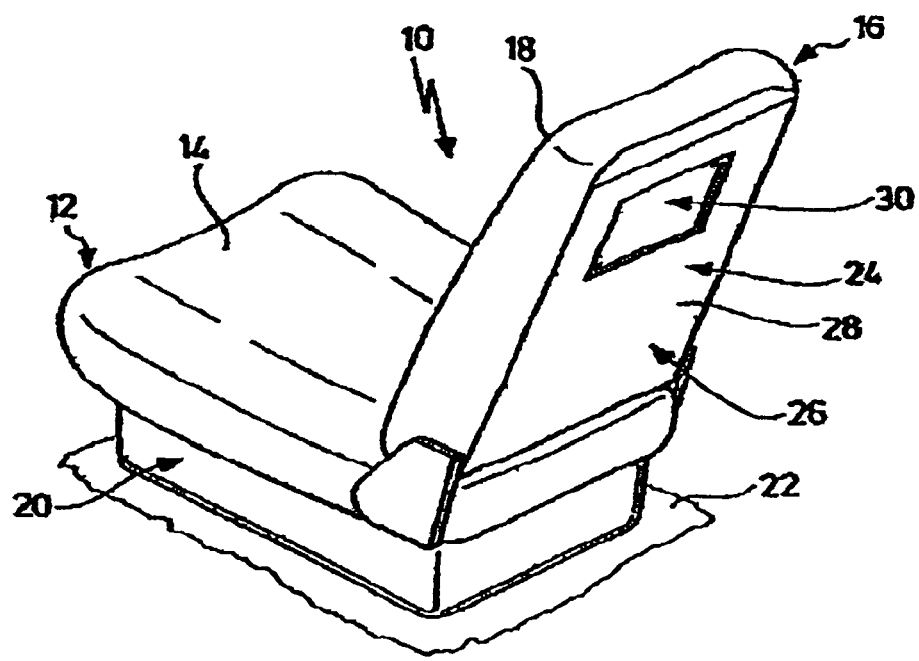
FIG. 14 is a schematic, perspective illustration of an advertising system in another embodiment of the disclosure.

Another embodiment of a seat comprising the advertising system designated as a whole as 10, in particular a seat for a commercial airplane, comprises a seat cushion 12, which has a seat surface 14, as well as a seat back 16 with a seat back surface 18 is shown in FIG. 14.

The seat cushion 12 thereby rests on a supporting frame 20, with which the entire seat 10 is supported on a floor surface 22.

The seat back 16 is provided on the side opposite the seat back surface 18 with a rear-side covering 24 which, in the case of the first embodiment, has a covering plate 26 with a surface 28 facing a person located behind the seat 10.

The covering plate 26 thereby bears, for example in the center in its upper half facing away from the supporting frame 20, an advertisement carrier 30 which is likewise visible to a person located, in particular sitting, behind the seat 10. This advertisement carrier 30 will be described in detail in the following form.

Figure 15:
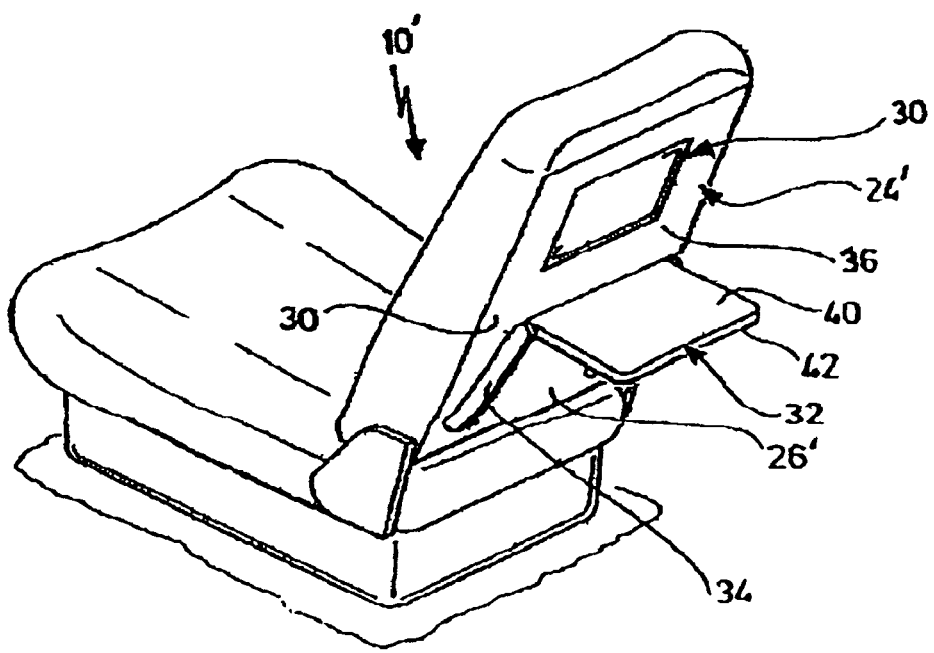
FIG. 15 is an illustration of the seat similar to FIG. 14 in another embodiment with a pulldown table pulled down.
Figure 16:
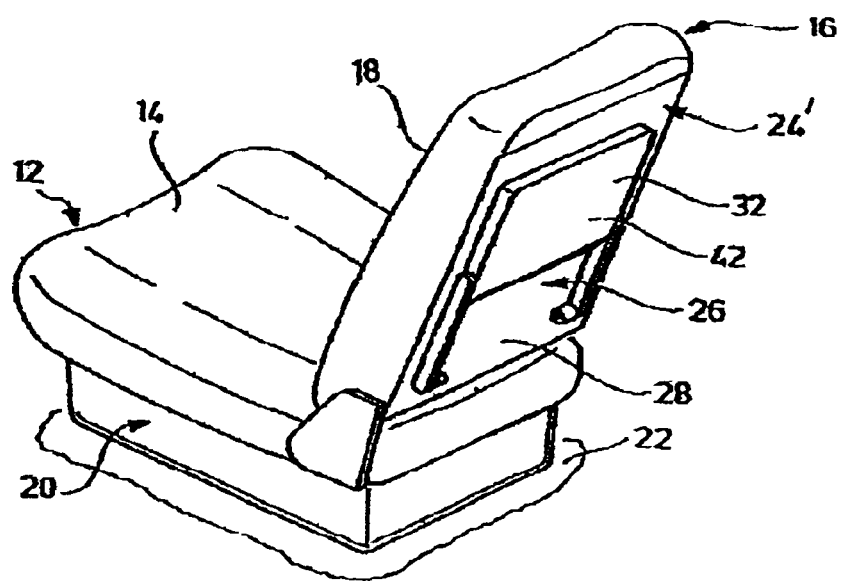
FIG. 16 is an illustration similar to FIG. 15 of the embodiment with a pulldown table folded away.

In another embodiment of a seat comprising the advertising system designated as a whole at 10', the covering 24' comprises a covering plate 26' with a pulldown table 32 which is articulatedly connected to the covering plate 26' via arms 34, the pulldown table 32 being tiltable between a pulled down position, illustrated in FIG. 15 and a folded away position, illustrated in FIG. 16. In order to accommodate the pulldown table 32 in its folded away position, the covering plate 26' is provided with a recessed region 36, in which the pulldown table 32 is located in its folded away position illustrated in FIG. 16.

The recessed region 36 has, for its part, a surface which faces a person using the pulldown table 32 when the pulldown table 32 is in the pulled down position and in the folded away position of the pulldown table 32 faces an upper side 40 of the pulldown table so that in this position the underside 42 of the pulldown table 32 faces the person located behind the seat 10'.

In the embodiment 10' of the seat comprising the advertising system, the advertisement carrier 30 is arranged on the surface of the region 36 and likewise advantageously in an upper half thereof.

With respect to additional features, reference is made in full to the embodiment of FIG. 14 and the same reference numerals as for this embodiment are also used for the identical elements.

Figure 17:
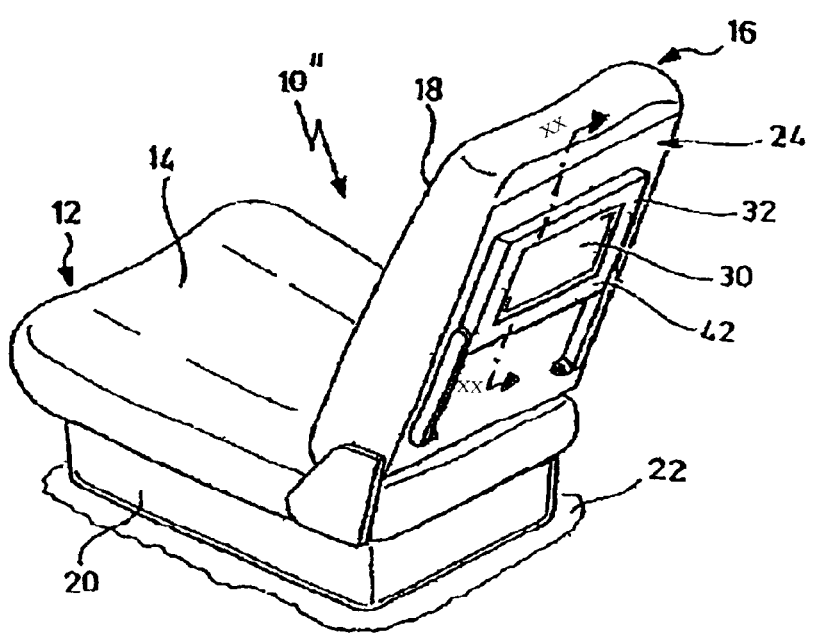
FIG. 17 is an illustration similar to FIG. 14 of another embodiment.

In another embodiment of a seat 10" comprising the advertising system, illustrated in FIG. 17, the advertisement carrier 30 is not arranged in the recess 36, but on the underside 42 of the pulldown table 32.

With respect to the additional features, reference is made in full to the explanations concerning the embodiments of FIGS. 14 and 15, the same elements having the same reference numerals.

Figure 20:
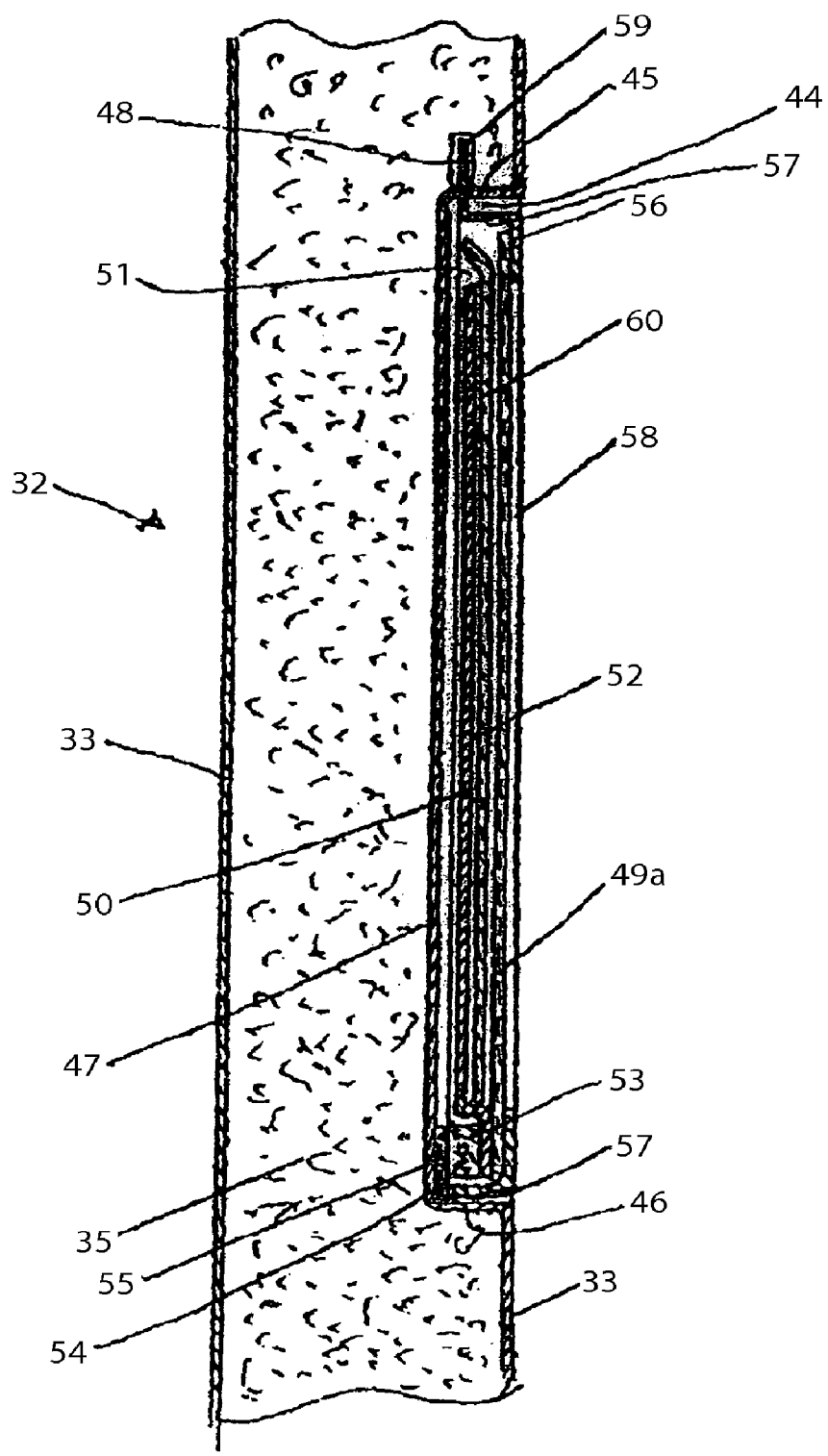
FIG. 20 is a sectional illustration along line XX-XX in FIG. 17.

In FIG. 20 the pulldown table is shown only in part and comprises side walls 33 of plastic sheet and a filling 35 of foamed plastic. In one of the side walls 33 a recess 44 is provided comprising an upper side wall 45, a lower side wall 46, not visible side walls and a bottom surface 47. In the upper side wall 45 as well as in the adjacent fitting of foamed plastic a slot 48 is arranged, extending over the entire length of the upper side wall 45.

The purpose of the recess 44 is to receive a receiving means for an advertisement carrier 30 in the form of a sheath consisting of a transparent cover plate 49a, facing away from the seat back 16 or the pulldown table 32, and of a supporting wall 50 spaced from the cover plate 49a and sealed thereto except along the upper side where an insertion opening 51 for the introduction of the advertisement 60 is provided.

Figure 18:
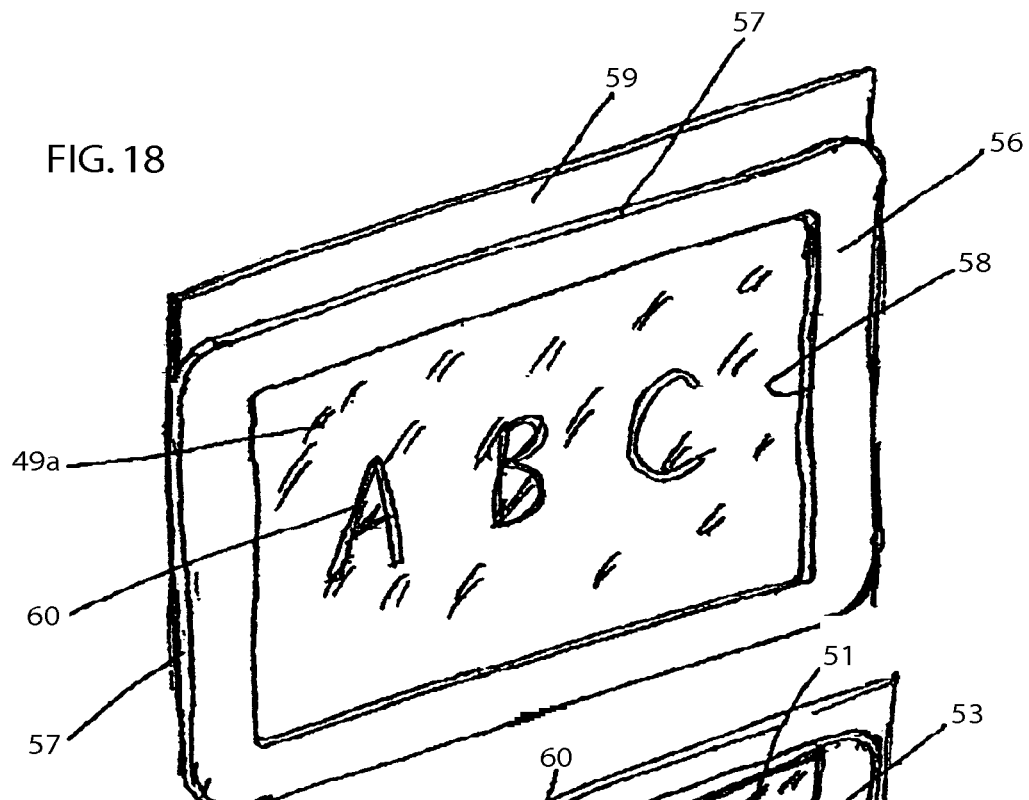
FIG. 18 is a perspective front view of the receiving means for an advertisement carrier.
Figure 19:
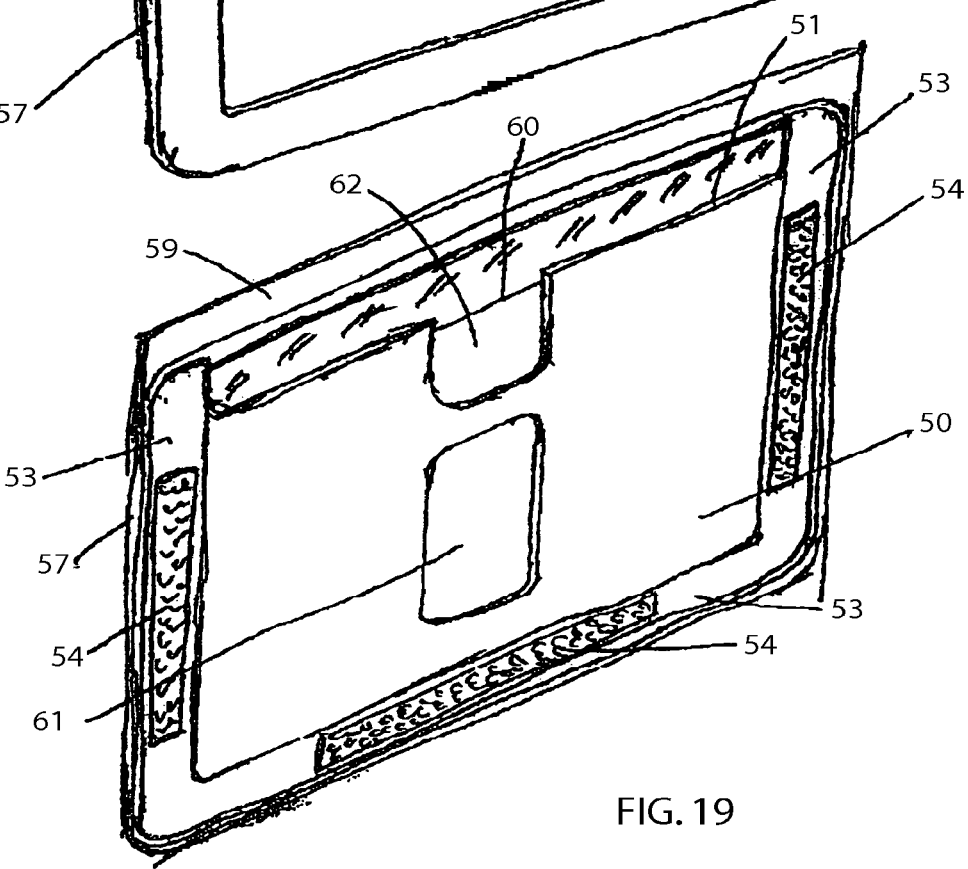
FIG. 19 is a perspective back view of the receiving means for an advertisement carrier.

A tab or flange 59 may be integral part of the cover plate 49a but is for example, according to the embodiment shown in FIGS. 18 to 20, part of a frame 56 surrounding and partly covering said cover plate 49a and being sealed thereto. By this means an opening 58 is provided in the frame 56 so that the advertisement 60 may be viewed through said opening 58 and the transparent cover plate 49a.

The frame 56 has side walls 57 (FIGS. 18 and 19) surrounding and covering the edges of the flange 53 of said cover plate 49a and is preferably opaque and may be manufactured or painted in various colors adapted to the color of the pulldown table 32 and/or of the seat back surface 18.

The supporting wall 50 consists of a central depression 52, the size of which corresponds to the size of the advertisement 60, and of a flange 53 surrounding said central depression 52 at three sides, except at the side where the insertion opening 51 is provided by cutting off the corresponding flange part. The flange 53 is sealed to the back side of the cover plate 49a and receives an adhesion means in the form of strips 54, 55 of cooperating hook and loop fastener elements secured to the flange 53 of said supporting wall 50 and to corresponding areas of said surface 47 of said recess 44 by an adhesive or by sewing.

The supporting wall 50 comprises a central opening 61 and a cut out 62 at the edge adjacent to the insertion opening 51 for gripping the advertisement 60 during insertion and removal of same.

The invention claimed is:

1. A display system for a vehicle seat, comprising:
   a receiving surface comprising a recess, the recess comprising an upper side wall, two lateral side walls, a lower side wall, a support surface and a slot for receiving a tab located on a cover insert; and
   the cover insert adapted to at least one of cover and fit into the recess, the cover insert comprising the tab and a sheath including a cover sheet, which faces away from the rear side of the seat, and the sheath comprising a supporting wall located between the cover sheet and the supporting wall when the cover insert is located in or over the recess, wherein the supporting wall is spaced from the cover sheet and wherein the supporting wall and the cover sheet are connected in the cover insert to form the sheath with one side of the sheath being open to provide an insertion opening for the introduction of the information carrier.

2. The display system of claim 1, wherein the supporting wall comprises a least one of an opening and a cut-out at an edge adjacent to the insertion opening, for gripping the information carrier during insertion and removal of same.

3. The display system of claim 1, wherein the supporting wall is in contacting juxtaposition with the cover sheet and is deformable in a direction away from the cover sheet when the information carrier is inserted between the supporting wall and cover sheet.

4. The display system of claim 1, wherein the tab comprises opposing engaging surfaces which are contained at least partially within the slot when the cover insert is in place in or over the recess.

5. The display system of claim 1, wherein the tab comprises a protrusion which is engageable with an aperture in the slot.

6. The display system of claim 1, wherein an internal surface of the slot extends in a direction which is not perpendicular to the receiving surface.

7. The display system of claim 6, wherein the tab is connected along at least part of one edge of the cover insert.

8. The display system of claim 7, further comprising at least one fastening means located on at least one or both of the cover insert and support surface for fastening the cover insert into or over the recess.

9. The display system of claim 8, wherein the fastening means comprises strips of cooperating hook and loop fastener elements secured to the cover insert and to corresponding areas of the supporting surface of the recess.

10. The display system of claim 1, wherein the tab is in the form of a protrusion which extends in a substantially parallel direction with respect to a display surface of the cover insert and away from a center of the cover insert and the slot is in the form of an aperture located at least one corner of the recess and the protrusion is located at a corner of the cover insert.

11. A method for removing a cover insert of a display system for a vehicle seat from a recess, comprising:
   applying a sucker to a display surface of the cover insert; and
   removing the cover insert from the recess with the sucker, wherein the step of removing comprises: pulling the cover sheet with the sucker in a direction which is substantially perpendicular to the display surface until a tab which extends into the recess from the display insert is no longer located in the recess, then subsequently sliding the cover insert with the sucker in a direction which is substantially parallel to the display surface.

12. The display system of claim 1, wherein the receiving surface is located on a rear side of a seat, wherein the rear side of the seat is defined as a side which faces away from the back of a person seated normally in the seat, and wherein the receiving surface is located in the field of vision of a person viewing the information carrier.

13. The display system of claim 12, wherein the receiving surface is located on an underside of a pulldown table connected to the rear side of the seat, wherein the pulldown table is moveable between a stowed position and an unstowed position, and wherein the pulldown table is arranged such that the underside of the table can be viewed by a person facing the rear side of the seat when the table is in its stowed position.

14. The display system of claim 12, wherein the receiving surface is rigidly fixed to a covering on the rear side of the seat.

15. The display system of claim 1, wherein at least a section of the cover insert is transparent or opaque.

16. The display system of claim 1, wherein the cover insert comprises a frame, and wherein the tab is located on the frame.

17. The display system of claim 1, wherein the supporting wall comprises a central depression and a flange surrounding the central depression at three sides, except at the side where the insertion opening is provided, wherein the flange is sealed to the back side of the cover insert, and wherein the cover insert comprises a frame, wherein the frame has side walls surrounding the cover sheet and at least partly covering the cover sheet, and wherein the side walls of the frame sealingly extend around the cover sheet and the flange of the supporting wall.

18. The display system of claim 1, wherein the tab comprises an engaging surface for engaging an internal surface of the slot.

19. The display system of claim 1, further comprising a seat cushion, a seat back, a supporting frame and a rear-side covering for the seat back, the seat back being provided with one of a recess in the rear-side covering or a pulldown table which is articulatedly connected to the seat back, provided with the recess on the side facing away from the seat back in the upright, folded away position of the pulldown table, wherein the tab extends along and above the insertion opening whereby when the tab is introduced into the slot and the supporting wall of the cover insert is adhered to the support surface of the recess by fastening means, the cover insert is nested in the recess and the advertisement carrier is protected against pollution, damage and manipulation by passengers.

* * * * *